(12) United States Patent
Green et al.

(10) Patent No.: US 10,699,703 B2
(45) Date of Patent: Jun. 30, 2020

(54) SYSTEM AND METHOD FOR ARTIFICIAL INTELLIGENCE ROUTING OF CUSTOMER SERVICE INTERACTIONS

(71) Applicant: AT&T Intellectual Property I, L.P., Atlanta, GA (US)

(72) Inventors: Don Green, Smyrna, GA (US); Mazin E. Gilbert, Warren, NJ (US); David Kapilow, Berkeley Hts, NJ (US); Kelley Mantione, Athens, GA (US); Sanjay Krishna, Johns Creek, GA (US); Wen-Ling Hsu, Bridgewater, NJ (US); Cheryl Brooks, Jersey City, NJ (US); Christopher Rath, Hillsborough, NJ (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 150 days.

(21) Appl. No.: 15/925,529

(22) Filed: Mar. 19, 2018

(65) Prior Publication Data
US 2019/0287517 A1 Sep. 19, 2019

(51) Int. Cl.
| | |
|---|---|
| *G10L 15/08* | (2006.01) |
| *H04M 3/22* | (2006.01) |
| *H04M 3/523* | (2006.01) |
| *G10L 15/06* | (2013.01) |

(52) U.S. Cl.
CPC ............ *G10L 15/08* (2013.01); *G10L 15/063* (2013.01); *H04M 3/2281* (2013.01); *H04M 3/523* (2013.01)

(58) Field of Classification Search
CPC .................................... G06Q 10/10; G06F 8/65; G10L 15/08; G10L 15/063; G10L 2015/223; G10L 2015/226; G10L 15/22; H04M 3/523; H04M 3/2281; H04M 3/5175
See application file for complete search history.

(56) References Cited

U.S. PATENT DOCUMENTS

| | | | |
|---|---|---|---|
| 8,370,155 B2 | 2/2013 | Byrd et al. | |
| 8,724,795 B1* | 5/2014 | Aldrich | H04M 3/51 379/265.02 |
| 9,077,804 B2 | 7/2015 | Kannan et al. | |
| 9,172,809 B1 | 10/2015 | Shockley et al. | |
| 9,336,526 B2* | 5/2016 | Tuchman | H04M 3/5166 |
| 9,454,732 B1 | 9/2016 | Garton et al. | |

(Continued)

OTHER PUBLICATIONS

"8 FAQS About Artificial Intelligence and Customer Service", https://www.interactions.com/8-faqs-artificial-intelligence-and-customer-service/, Dec. 14, 2016.

(Continued)

*Primary Examiner* — Akelaw Teshale
(74) *Attorney, Agent, or Firm* — Guntin & Gust, PLC; John G. Rauch

(57) ABSTRACT

Aspects of the subject disclosure may include an artificial intelligence method of routing customer service interactions which begins with an analysis of a body of historical interactions with customers. By monitoring an interaction between a user and an agent, the user's issue may be determined and a potential resolution resource may be identified. By monitoring an exchange between the user and the resource, the analysis may be updated. Other embodiments are disclosed.

20 Claims, 6 Drawing Sheets

(56) References Cited

U.S. PATENT DOCUMENTS

| | | | | |
|---|---|---|---|---|
| 9,742,916 | B1* | 8/2017 | Christopher | H04M 7/003 |
| 9,762,733 | B1* | 9/2017 | Ramanujaiaha | H04M 3/5183 |
| 10,009,465 | B1* | 6/2018 | Fang | H04M 3/5175 |
| 2011/0055699 | A1* | 3/2011 | Li | G06F 16/951 |
| | | | | 715/709 |
| 2012/0016678 | A1* | 1/2012 | Gruber | G06F 40/40 |
| | | | | 704/275 |
| 2013/0211880 | A1 | 8/2013 | Kannan et al. | |
| 2014/0188552 | A1 | 7/2014 | Chan et al. | |
| 2015/0256675 | A1 | 9/2015 | Sri et al. | |
| 2016/0196491 | A1* | 7/2016 | Chandrasekaran | G06F 16/26 |
| | | | | 706/50 |
| 2017/0140387 | A1 | 5/2017 | Nandi et al. | |
| 2017/0372231 | A1 | 12/2017 | Ghatage et al. | |
| 2018/0007202 | A1* | 1/2018 | Batlle | H04M 3/5183 |
| 2018/0027130 | A1 | 1/2018 | Yermakov et al. | |
| 2019/0050588 | A1* | 2/2019 | Brew | G06F 21/629 |

OTHER PUBLICATIONS

"8 Different Types of Customer Service Automation Technologies", https://www.topbots.com/8-different-types-customer-service-automation-technologies/, Jun. 13, 2017.

"Best Practices in Implementing A.I. for Customer Care", https://www.topbots.com/best-practices-artificial-intelligence-customer-care-service/, Jun. 13, 2017.

"Call Center Automation Powered by AI", https://www.smartaction.ai/, 2017.

"Digital Genius", https://www.digitalgenius.com/, 2017.

"How will artificial intelligence assist customer service agents?", https://www.zendesk.com/blog/artificial-intelligence-customer-service-agents/, Jul. 21, 2017.

"Improving Customer Service with Amazon Connect and Amazon Lex", http://www.allthingsdistributed.com/2017/06/amazon-connect-with-amazon-lex.html, Jun. 30, 2017.

"Intelligent automated conversations with a human touch", https://www.nuance.com/omni-channel-customer-engagement/digital/virtual-assistant/nina.html, 2018.

Kim, Su Nam et al., "Classifying dialogue acts in one-on-one live chats", Proceedings of the 2010 Conference on Empirical Methods in Natural Language Processing.Association for Computational Linguistics, 2010.

Schneider, Christie, "10 reasons why AI-powered, automated customer service is the future", https://www.ibm.com/blogs/watson/2017/10/top-7-trends-for-enterprise-call-centers-in-2018/, Oct. 16, 2017.

Schneider, Christie, "Top 7 trends for enterprise call centers and customer service in 2018", https://www.ibm.com/blogs/watson/2017/10/top-7-trends-for-enterprise-call-centers-in-2018/, Oct. 23, 2017.

* cited by examiner

SYSTEM AND METHOD FOR ARTIFICIAL INTELLIGENCE ROUTING OF CUSTOMER SERVICE INTERACTIONS

FIELD OF THE DISCLOSURE

The subject disclosure relates to a system and method for artificial intelligence routing of customer service interactions, such as through online chat sessions.

BACKGROUND

Currently, human-based customer service chat systems are used to facility customer service interactions to help resolve user problems and other issues. These systems are not always efficient, as many rely on the knowledge and/or experience of individual customer service agents, which can vary between agents, to resolve user problems.

BRIEF DESCRIPTION OF THE DRAWINGS

Reference will now be made to the accompanying drawings, which are not necessarily drawn to scale, and wherein.

DETAILED DESCRIPTION

Figure 1:
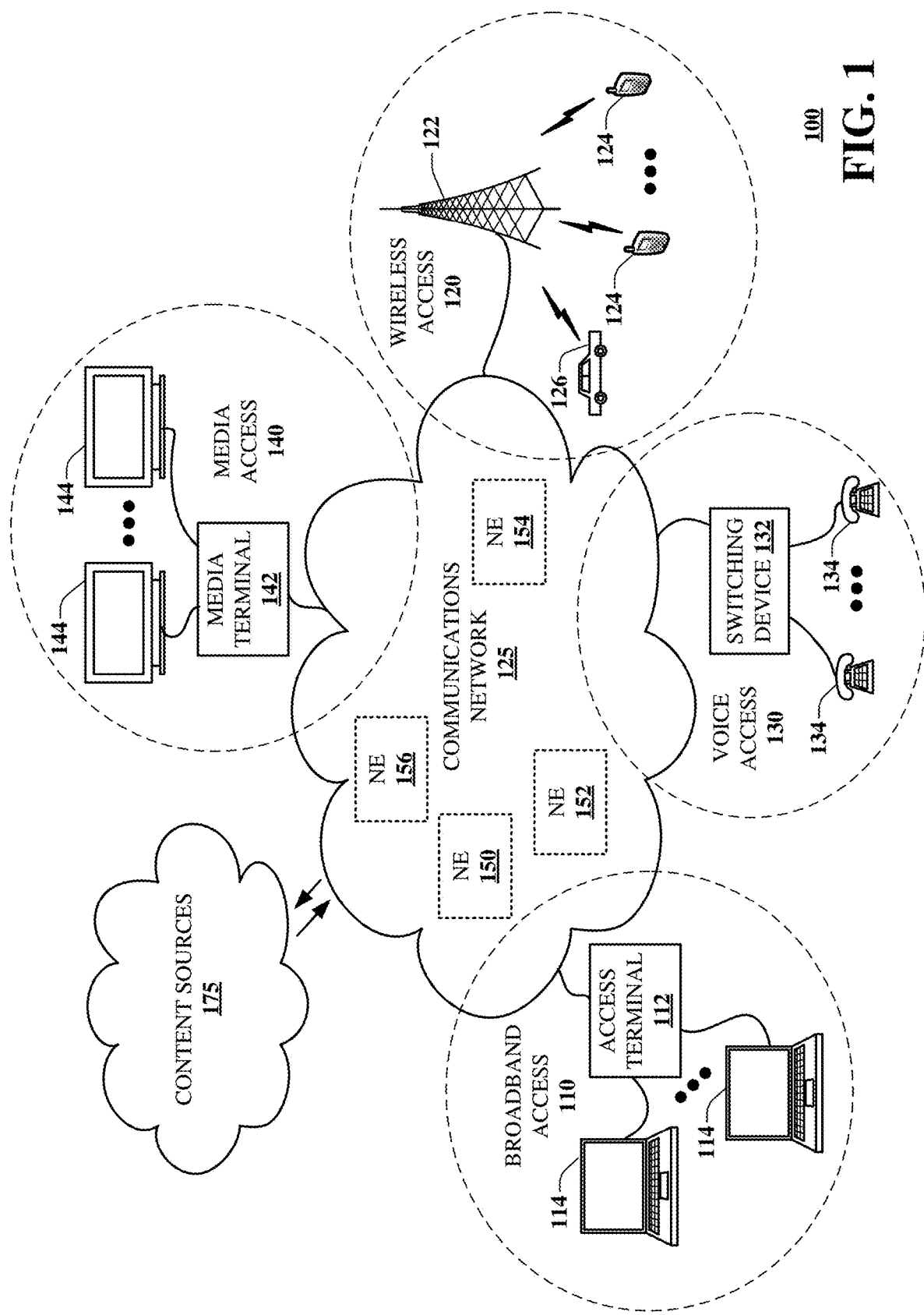
FIG. 1 is a block diagram illustrating an example, non-limiting embodiment of a communications network in accordance with various aspects described herein.

The subject disclosure describes, among other things, illustrative embodiments for artificial intelligence routing of customer service interactions. Other embodiments are described in the subject disclosure. U.S. Pat. Nos. 9,871,922, 9,876,909, and U.S. Patent Application Publication No. 2018/0007204 share a common inventor with the present disclosure, and are incorporated herein by specific reference.

One or more aspects of the subject disclosure include a method of artificial intelligence routing of customer service interactions which can begin with reviewing and creating an analysis of a body of historical interactions with customers. The analysis may include extracting or otherwise identifying a plurality of historical key phrases from the historical interactions. Those historical key phrases may be used to populate a look-up table or database. The analysis may also include identifying a plurality of historical issues from the historical interactions and associating the historical key phrases with related historical issues, in the table or database. The analysis may also include identifying a plurality of historical resolution resources involved in resolving the historical issues and associating the historical resolution resources with related ones of the historical issues and/or historical key phrases in the table or database.

The method may also include receiving some sort of indication of one or more issues from a device of a user or customer. This indication may come straight from the customer, such as by their initiating a chat session. An interaction between the user and an agent is established and/or monitored. By monitoring the interaction between the user and the agent, one or more potential key phrases may be identified or extracted from the indication and/or the interaction.

Once one or more potential key phrases have been identified, they may be compared with the historical key phrases to identify one or more matching key phrases. Then, one or more potential issues may be identified as one or more historical issues associated with the one or more historical key phrases that match the one or more potential key phrases. One or more identified issues may be created or identified by refining or filtering the one or more potential issues according to information known about the user, such as prior communications with the user and/or account information of the user.

Once one or more issues are identified, such as the issue(s) of the user, a pool, or group, of resolution resources may be identified, or otherwise created, from the historical resolution resources associated with the historical issues most closely matching the one or more identified issues. Then, a potential resolution resource may be selected from the pool based on the information known about the user. The potential resolution resource may be suggested to the user and/or the agent. The user may be connected to the potential resolution resource automatically, or connected in response to the user and/or the agent accepting the suggestion.

In other words, by monitoring the interaction between the user and the agent, an artificial intelligence system can pick out key words or phrases, compare those key words or phrases to what it has learned through the analysis of historical interactions with user to identify not only the problem the user is experiencing, but also a resource to help the user resolve that problem. By monitoring the interaction between the user and the agent and/or the exchange between the user and the potential resolution resource, the analysis may be updated and improved, thereby continually learning which resources are more adept at resolving user, or customer, problems.

One or more aspects of the subject disclosure include executable instructions, which may be stored on machine-readable storage medium, that facilitate obtaining an analysis of a plurality of historical interactions. The instructions may facilitate performing, or merely accessing, the analysis, which may be similar to that discussed above. The instructions may facilitate an interaction between a device of a user and an agent and/or merely monitoring the interaction between the user and the agent. In either case, the instructions may facilitate obtaining an indication of one or more user issues based on the interaction.

The instructions may facilitate identifying one or more potential key phrases from the interaction and/or indication. The instructions may facilitate comparing the potential key phrases with the historical key phrases, thereby determining one or more matching key phrases. The matching key phrases may be one or more historical key phrases that match the one or more potential key phrases. The instructions may facilitate determining one or more potential issues as one or more historical issues associated with the one or more historical key phrases that match the one or more potential key phrases, and then identifying the user issue by refining the one or more potential issues according to a relationship with the user. The relationship may include prior communications with the user and/or account information of the user.

The instructions may facilitate selecting a potential resolution resource from the historical resolution resources associated with the historical issues based on the user issue and the relationship with the user, and then suggesting the potential resolution resource to the user and/or agent. The instructions may facilitate requesting from the user and/or agent an acceptance of the potential resolution resource. In response to receiving the acceptance, the instructions may facilitate an exchange between the user and the potential resolution resource. The instructions may facilitate monitoring the exchange between the user and the potential resolution resource and then updating the analysis based on the interaction between the user and the agent and the exchange between the user and the potential resolution resource.

One or more aspects of the subject disclosure include a processing system, that creates, or merely accesses, an analysis of a plurality of historical interactions, which may be similar to that discussed above. The system may facilitate or monitor an interaction between a device of a user and an agent and thereby discern an indication of a user issue. The system may identify one or more potential key phrases from the interaction and then identify one or more matching key phrases, which may be one or more historical key phrases that match the one or more potential key phrases. The system may then identify one or more potential issues as one or more historical issues associated with the one or more historical key phrases that match the one or more potential key phrases. The system may then refine the one or more potential issues according to information known about the user, thereby identifying the user issue.

Knowing what the user issue is helps the system identify a potential resolution resource from the historical resolution resources associated with the historical issues based on the user issue and facilitating an exchange between the user and the potential resolution resource. By monitoring the exchange between the user and the potential resolution resource, the system can learn which resources are more adept at resolving the user issue, and update the analysis based thereon.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions, such as customer service interactions.

As one can appreciate, having read this disclosure, an enterprise may have a large number of customer interactions, over time. Such interactions may occur over the communications network 125, through the broadband access 110, voice access 130, wireless access 120, media access 140, or any combination thereof. If those interactions were digitized, or otherwise captured, a collection thereof could be referred to as historical interactions. Such historical interactions may be stored, for example, in one or more of the content sources 175. For example, raw text transcripts may be stored for analysis. In some embodiments, summary reports of chat sessions and/or phone calls may be stored and/or analyzed.

Figure 2:
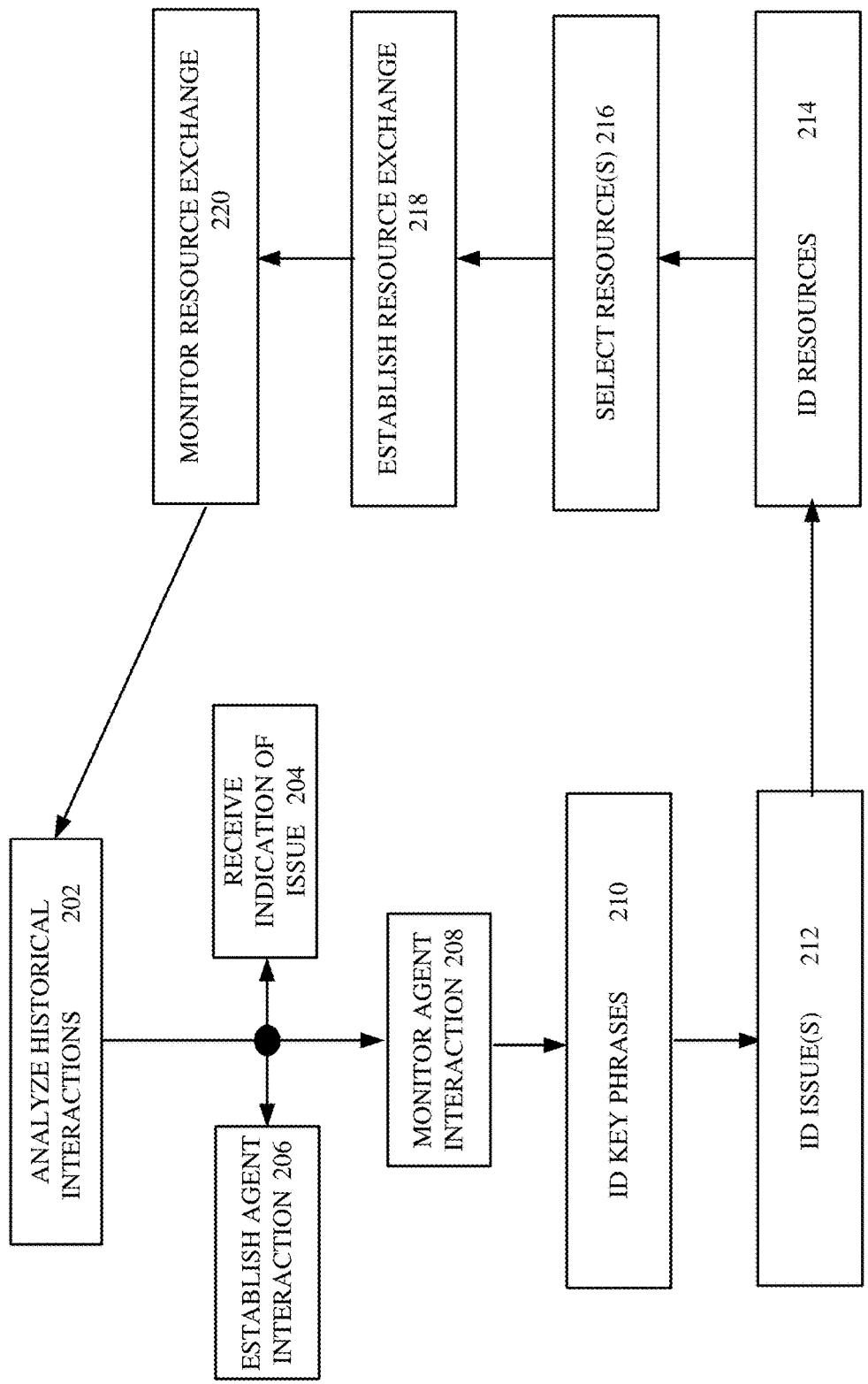
FIG. 2 depicts an illustrative embodiment of a method in accordance with various aspects described herein.

FIG. 2 depicts an illustrative embodiment of a method 200 in accordance with various aspects described herein. At least one embodiment of the method 200 seeks to leverage those historical interactions for artificial intelligence routing of current user or customer service interactions.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The method 200 can begin by creating an analysis of the historical interactions, as shown in step 202. The analysis may include extracting or otherwise identifying a plurality of historical key phrases from the historical interactions. Those historical key phrases may be used to begin to populate a look-up table or database. The analysis may also include identifying a plurality of historical issues from the historical interactions and associating the historical key phrases with related historical issues in the table or database. The analysis may also include identifying a plurality of historical resolution resources involved in resolving the historical issues and associating the historical resolution resources with related ones of the historical issues and/or historical key phrases in the table or database. The database may also be stored in one or more of the content sources 175 of FIG. 1.

Variations to the above described method are possible. For example, in one embodiment, the historical interactions include interactions between representatives of the enterprise or service provider and all, or groups(s), of its users or customers. In another embodiment, the historical interactions considered for a specific user may be limited to interactions with the specific user, or with other users associated with that user's equipment, such as through a subscriber agreement. In some embodiments, the historical interactions considered in the analysis may be limited to those issues that were successfully resolved. In some embodiments, the historical interactions considered in the analysis may include issues that were partially resolved and/or unresolved. In some embodiments, the historical interactions include tests performed and results of those test, such as self-tests, and/or network tests.

In any case, the analysis may be performed by or at the content sources 175 of FIG. 1. In such cases, the analysis may be made available to any or all of the network elements 150, 152, 154, 156, each of which may perform any or all of the method 200. In other embodiments, the analysis may be performed by or at any or all of the network elements 150, 152, 154, 156, and then forwarded to or otherwise made available to the content sources 175.

The method 200 continues with receiving an indication of one or more user issues, as shown in step 204, establishing an interaction between a user and an agent, as shown in step 206, and/or monitoring an interaction between a user and an agent, as shown in step 208. All, or only some, of these steps may be required for different situations. For example, the indication may come in the form of one or more of an email, a message, a call or a chat, a call or a chat request, an external posting on social media, or the user's browsing history. An indication may also come from recognition of a pattern based on a specific user's historical interactions. For example, the user might have a habit of contacting customer service every month when they review their bill. The method 200 may recognize this and reach out to the user to go over the bill with them. In these cases, the method 200 would proceed to attempt to establish and then monitor the interaction between the user and the agent.

It should be understood, that certain embodiments may monitor users and/or their interactions and exchanges, as will be described in more detail below. In at least some embodiments, the user may be given an option to opt-in or opt-out of such monitoring.

In one embodiment, an interaction between a user and an agent may be established without an indication of an issue. In this case, the indication of an issue may be received or otherwise recognized thereafter, such as by monitoring the interaction between the user and the agent. In another embodiment, the method 200 may begin monitoring an ongoing interaction between a user and an agent. In any case, the method 200 may continue to monitor the interaction between the user and the agent, as shown in step 208.

In one embodiment, the agent is a live agent, such as an initial level customer service agent. In another embodiment, the agent is automated, such as a chat-bot or another form of artificial intelligence, such as a questionnaire tree that branches off into different questions depending on the user's answers.

In any case, by continuing to monitor the interaction between the user and the agent, as shown in step 208, potential key words or phrases can be recognized, extracted, or otherwise identified, as shown in step 210. In some embodiments, such potential key words or phrases can be recognized, extracted, or otherwise identified from the indication of the user issue. The monitoring described herein may be automated, such as through the use of natural language processing and/or model driven machine learning to automatically understand user (or customer) voice and textual input and to provide automated responses.

The method 200 then seeks to identify one or more matching key phrases from the historical key phrases stored in the content sources 175 of FIG. 1. This can be done, for example, by comparing the potential key phrases with the historical key phrases. The matching key phrases can be identified as one or more historical key phrases that match the one or more potential key phrases.

Armed with the matching key phrases, the method 200 next seeks to identify one or more potential issues, as shown in step 212. For example, as described above, the content sources 175 of FIG. 1 may store one or more databases that correlate the historical key phrases with related historical issues. By matching the potential key phrases with the historical key phrases, one identifies matching key phrases as one or more historical key phrases that match the one or more potential key phrases. Thus, the potential issues can be identified as one or more historical issues associated with the one or more historical key phrases that match the one or more potential key phrases.

It can be appreciated, that identifying potential issues based on key words or phrases identified during an interaction between a user and an agent can lead to an over-inclusive group of potential issues. For example, potential issues may be identified in this manner that may be unrelated to that specific user. For example, if the user subscribes only to a home telephone service, potential issues related to Internet connectivity and/or television services are unlikely to be the real issue the user is experiencing, regardless of whether key words or phrases have been used during the interaction. Similarly, if the user subscribes only to an Internet service, potential issues related to telephone and/or television services are unlikely to be the real issue the user is experiencing, regardless of whether key words or phrases have been used during the interaction. Further, if the user subscribes only to a television service, potential issues related to internet connectivity and/or telephone services are unlikely to be the real issue the user is experiencing, regardless of whether key words or phrases have been used during the interaction. Of course, if the user subscribes to a combination of services, then some potential issues may be relevant, while others are not. Some of the potential issues may also be more or less relevant regionally and/or temporally.

Thus, the method 200 proceeds to refine the one or more potential issues according to information known about the user, such as a relationship with the user, which may include communications with the user and/or account information of the user, such as an identification of services to which the user subscribes. The information known about the user may include the user's location, prior communications with the user, to which services the user subscribes, which devices or accessories the user has/uses, their preferences, their purchases, their usage information, the current day or time of day, as well as other information known.

The information known about the user, such as a relationship with the user, may also include one or more libraries of terms. These libraries of terms may be especially relevant to the user, based on the services to which that user subscribes and may therefore be used as key words. In some embodiments, the libraries of terms may include key words for certain services. For example, one library of terms may include key words for Internet service, while another library of terms may include key words for home telephone service. Some terms, or key words, may appear in several libraries. In this case, the same term/word/phrase may have different meanings based upon the library it is associated with, and thus the related service. In this manner, key words may be picked out, and even interpreted, based on the services to which the user subscribes. Furthermore, certain potential key words may be ignored should they be associated with a library that is related to a service to which the user does not subscribe. Thus, for each user, select ones of the libraries of terms may be used (while others are ignored) to pick out, and interpret, potential key words or phrases, in an effort to identify the user's issue, based on the relationship with the user, such as the services to which the user subscribes. In this manner, the potential issues can be refined to one or more identified issues.

With the issues refined, or otherwise identified, the method 200 then creates a pool of, or otherwise identifies, one or more resolution resources from the historical resolution resources, as shown in step 214. More specifically, the pool of resolution resources may include the historical resolution resources associated with the historical issues most closely matching the one or more identified issues. Then, as shown in step 216, the method 200 progresses to selecting a potential resolution resource from the pool. The potential resolution resource may be selected based on a number of factors, such as that resource's prior success rate with the identified issue(s). The potential resolution resource may be selected based on other factors, such as the information known about the user and/or time of day (i.e. some resources may not be available certain times and days).

With potential resolution resource selected, the method 200 proceeds to step 218 where an exchange between the user and the potential resolution resource is established. This can be done a number of ways. For example, in one embodiment, the exchange between the user and the potential resolution resource is automatically established. In another embodiment, the potential resolution resource is suggested to the agent interacting with the user. In this case, an acceptance of the potential resolution resource may be requested of the agent. Requesting acceptance may be done, for example, because the agent may be in a better position to suggest or otherwise choose the potential resolution resource. The agent may also be able to resolve the user's issue without escalation to another resource. Thus, in some embodiments, permission or acceptance of the agent may be requested before establishing the exchange between the user and the potential resolution resource.

In still another embodiment, the potential resolution resource is suggested to the user. In this case, an acceptance of the potential resolution resource may be requested of the user. Requesting such acceptance may be done, for example, because the agent is automated or a questionnaire, and/or may not include appropriate decision making capability. The user may also prefer to stay with the agent and/or may prefer some other form of escalation. Thus, in some embodiments, permission or acceptance of the user may be requested before establishing the exchange between the user and the potential resolution resource. Of course, such acceptance may be requested of both the agent and the user.

It should be noted, that the interaction between the user and the agent may be continually monitored. In this manner, key words or phrases may be continually identified, the potential issue(s) may be continually refined, and potential resolution resources may be continually identified. The information known about the user, and/or the user relationship, may also be continuously updated. Furthermore, where the agent has been successful in resolving the user's issue, the analysis may be updated, possible marking that agent as a resolution resource of the identified issue.

In any case, in response to receiving the acceptance (or where done automatically), an exchange between the user and the potential resolution resource is facilitated and monitored, as shown in step 220. By monitoring the exchange between the user and the potential resolution resource, the analysis may be updated based on the exchange between the user and the potential resolution resource. The analysis may also be updated based on the interaction between the user and the agent. In addition to updating the analysis, the relationship with the user may be updated based on the interaction between the user and the agent and/or the exchange between the user and the potential resolution resource. In any case, by monitoring the interaction between the user and the agent and the exchange between the user and the potential resolution resource, whether or not the agent and/or the potential resolution resource was able resolve the issue can be discerned, and the analysis updated. Finally, based on the interaction between the user and the agent and/or the exchange between the user and the potential resolution resource, the historical interactions, and analysis thereof can be updated.

In one embodiment, the potential resolution resource may be a live agent, such as an escalation level customer service agent. In another embodiment, the potential resolution resource is automated, such as a chat-bot, or other form of artificial intelligence. In another embodiment, the potential resolution resource may be embodied by a series of questions, such as a questionnaire tree that branches off into different questions depending on the user's answers. In any case, potential resolution resource may provide self-service solutions, such as instructions to the user so that they can resolve or diagnose their issue themselves, may resolve the issue for the user, may schedule or otherwise coordinate a technician to resolve the user's issue, or any combination thereof.

In one embodiment, the above described features are embodied in executable instructions, potentially stored on non-transitory machine-readable storage medium. The executable instructions may perform or otherwise facilitate, when executed by a processor, the method 200. All or portions of the executable instructions may be executed by or at the content sources 175 of FIG. 1. In other embodiments, all or portions of the executable instructions may be executed by or at any or all of the network elements 150, 152, 154, 156.

For example, the executable instructions may facilitate obtaining an analysis of a plurality of historical interactions, as described above. The executable instructions may facilitate monitoring an interaction between a device of a user and a live agent, thereby (or otherwise) obtaining an indication of one or more user issues. The executable instructions may facilitate identifying one or more potential key phrases from the interaction. The executable instructions may facilitate determining one or more matching key phrases, by comparing the potential key phrases with the historical key phrases, wherein the one or more matching key phrases comprise one or more historical key phrases that match the one or more potential key phrases. The executable instructions may facilitate determining one or more potential issues as one or more historical issues associated with the one or more historical key phrases that match the one or more potential key phrases. The executable instructions may facilitate identifying the user issue by refining the one or more potential issues according to a relationship with the user, wherein the relationship includes both prior communications with the user and account information of the user.

Additionally, the executable instructions may facilitate selecting a potential resolution resource from the historical resolution resources associated with the historical issues based on the user issue and the relationship with the user. The executable instructions may facilitate suggesting the potential resolution resource to the live agent. The executable instructions may facilitate requesting from the live agent an acceptance of the potential resolution resource. The executable instructions may facilitate facilitating an exchange between the user and the potential resolution resource, in response to receiving the acceptance. The executable instructions may facilitate monitoring the exchange between the user and the potential resolution resource and updating the analysis based on the interaction between the user and the agent and the exchange between the user and the potential resolution resource.

In some embodiments, the content sources 175 and/or any or all of the network elements 150, 152, 154, 156, of FIG. 1, may comprise a system having a processor and a memory that stores executable instructions, such as those described above. In some embodiments, the system and/or executable instructions may, or may facilitate, creating an analysis of a plurality of historical interactions, such as that described above. The system and/or executable instructions may, or may facilitate, monitoring an interaction between a device of a user and an agent, thereby discerning an indication of a user issue. The system and/or executable instructions may, or may facilitate, identifying one or more potential key phrases from the interaction. The system and/or executable instructions may, or may facilitate, identifying one or more matching key phrases, wherein the one or more matching key phrases comprise one or more historical key phrases that match the one or more potential key phrases. The system and/or executable instructions may, or may facilitate, identifying one or more potential issues as one or more historical issues associated with the one or more historical key phrases that match the one or more potential key phrases. The system and/or executable instructions may, or may facilitate, identifying the user issue by refining the one or more potential issues according to a relationship with the user, wherein the relationship includes account information of the user.

Additionally, the system and/or executable instructions may, or may facilitate, identifying a potential resolution resource from the historical resolution resources associated with the historical issues based on the user issue. The system and/or executable instructions may, or may facilitate, an exchange between the user and the potential resolution resource. The system and/or executable instructions may, or may facilitate, monitoring the exchange between the user and the potential resolution resource and updating the analysis based on the exchange between the user and the potential resolution resource.

By monitoring the exchange between the user and the potential resolution resource, further issues may be identified, and/or of the current issue may be refined, such that another potential resolution resource is then identified, selected, and/or suggested. For example, network conditions may change, tests may be performed, and/or equipment may be changed, during the exchange between the user and the potential resolution resource. Thus, monitoring the exchange between the user and the potential resolution, including any concurrent or related testing, etc., may lead to suggesting another the potential resolution resource.

By monitoring the interaction between the user and the agent and monitoring the exchange between the user and the potential resolution resource, the system can continually learn not only which resources are more adept at resolving the user issue, but also continue to build, or update, the database of key phrases, associated issues, and associated resolution resources, as well as update the analysis based thereon. Such monitoring may also be used to continually learn about the individual users, the issues they commonly experience, in relation to the other information known about the users, thereby continually updating the relationship with the users. Such monitoring may also be used to continually learn about the issues user(s) commonly experience, how those issues may relate to one another and/or other information known about the users, how to successfully identify, and/or diagnose, those issues, as well as how (or what resources to use) to resolve those issues.

In at least one embodiment, the system and/or executable instructions merely monitor the exchange between the user and the potential resolution resource, and may or may not actually establish that exchange. In other embodiments, the system and/or executable instructions may actually govern the exchange between the user and the potential resolution resource and/or the interaction between the user and the agent, such as when the agent or potential resolution resource is automated.

Figure 3:
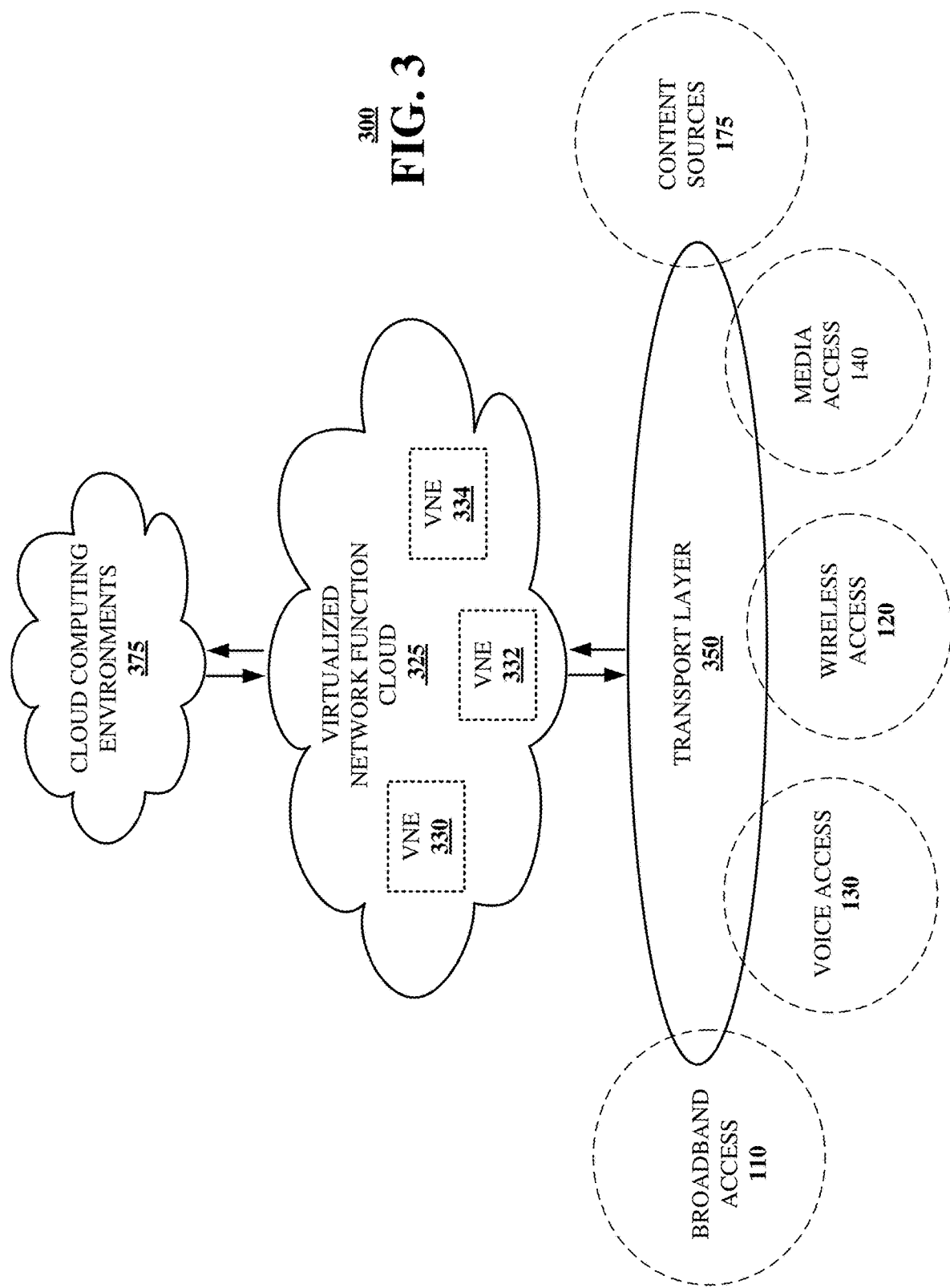
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100 and method 200 presented in FIGS. 1 and 2. For example, the interaction between the user and the agent and/or the exchange between the user and the potential resolution resource may occur over the virtualized communication network. In one embodiment, the communications network 125 is a virtualized communication network, such as that shown in FIG. 3.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
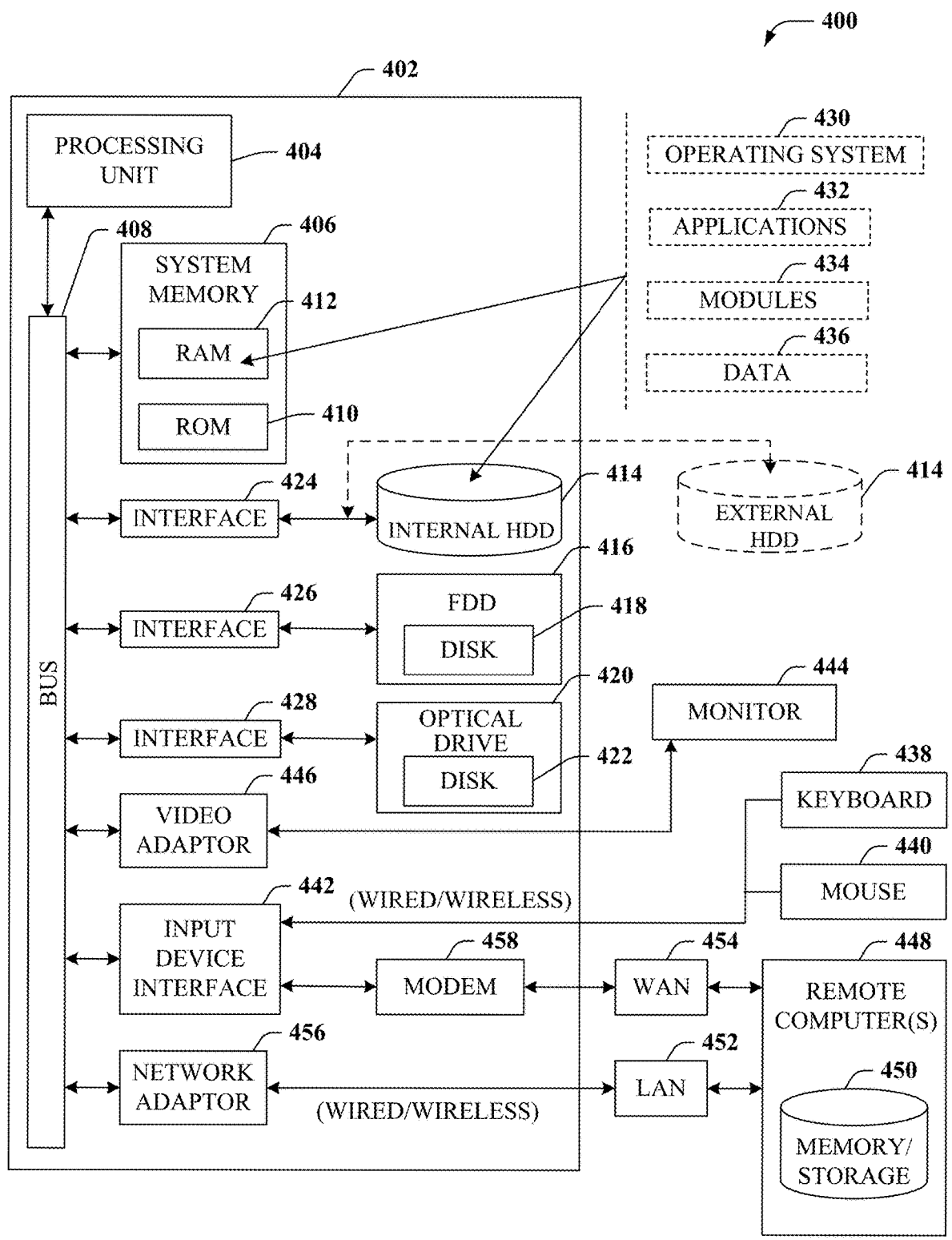
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software. For example, the computing environment shown in FIG. 4 may perform the analysis of the historical interactions discussed above. The computing environment shown in FIG. 4 may perform, or otherwise facilitate, the interaction between the user and the agent and/or the exchange between the user and the potential resolution resource.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
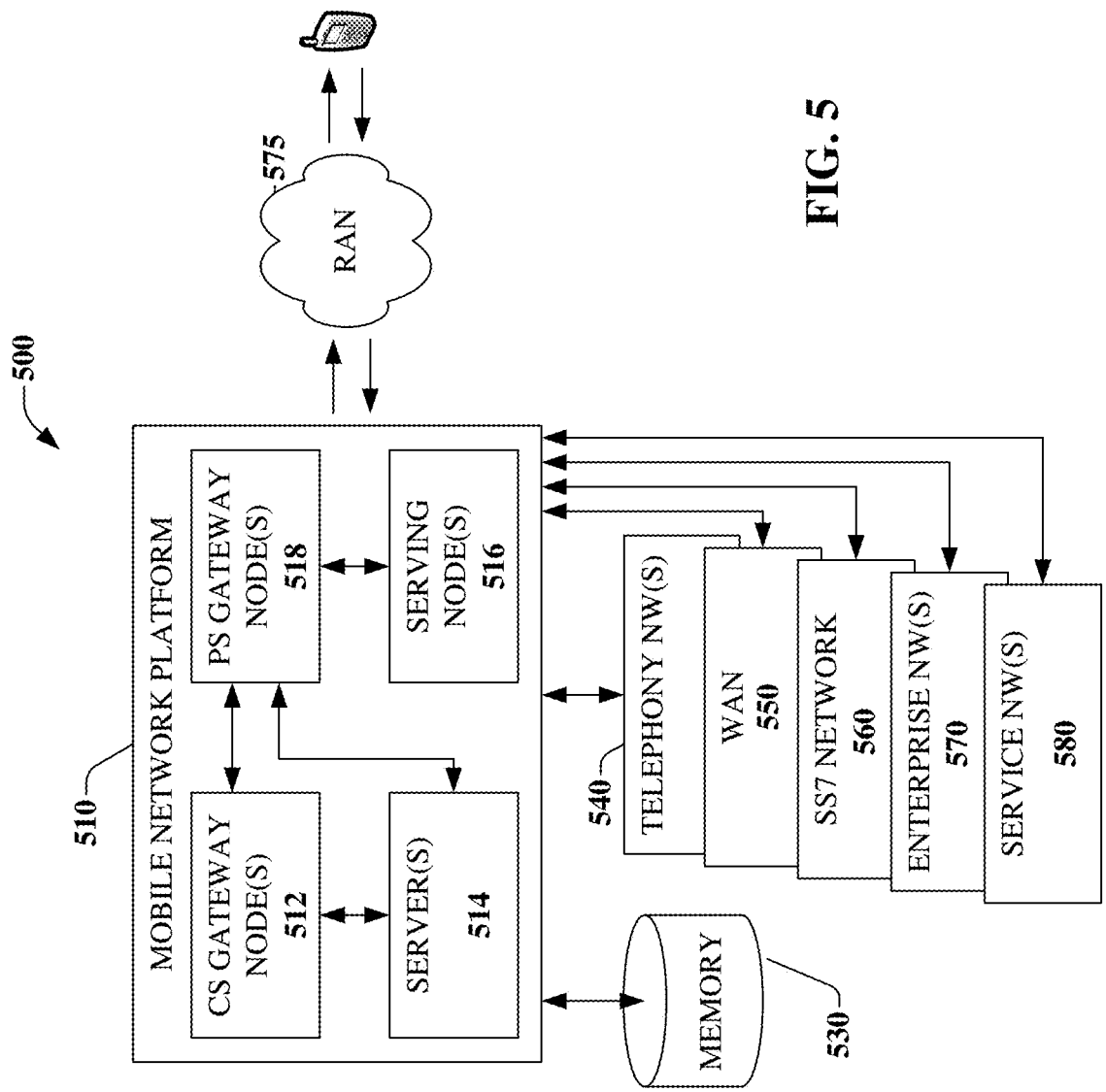
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. The mobile network platform 510 may be used to facilitate the interaction between the user and the agent and/or the exchange between the user and the potential resolution resource.

In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
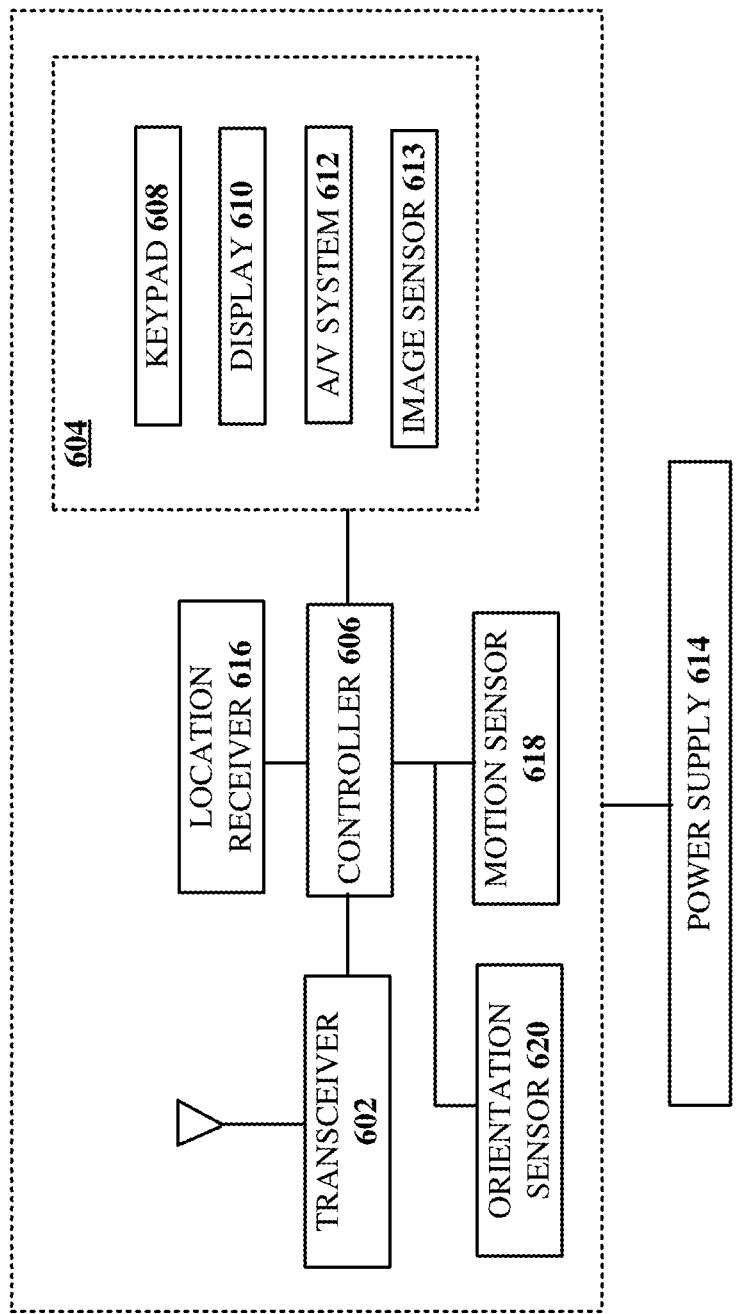
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the user may use the communication device 600 during the interaction between the user and the agent and/or the exchange between the user and the potential resolution resource.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. For example, should the potential resolution resource be unable to resolve the user issue, by monitoring the exchange between the potential resolution resource and the user, subsequent issues and/or subsequent resolution resources may be identified. Additionally, the analysis of the historical interactions may be refined based on the information known about the individual users involved. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
creating, by a processing system comprising a processor, an analysis of a plurality of historical interactions with a plurality of users of a plurality of different communication services provided by a service provider, the analysis including retrieving the plurality of historical interactions with the plurality of users, extracting a plurality of historical key phrases from the plurality of historical interactions, identifying a plurality of historical issues from the plurality of historical interactions, associating the historical key phrases with related ones of the historical issues, identifying a plurality of historical resolution resources involved in resolving the historical issues, and associating historical resolution resources with related ones of the historical issues;
receiving, by the processing system, an indication of one or more issues from a device of a user;
establishing, by the processing system, an interaction between the user and an agent;
extracting, by the processing system, one or more potential key phrases from the indication and the interaction between the user and the agent;
identifying, by the processing system, one or more matching key phrases, by comparing the potential key phrases with the historical key phrases, wherein the one or more matching key phrases comprise one or more historical key phrases that match the one or more potential key phrases;
identifying, by the processing system, one or more potential issues as one or more historical issues associated with the one or more historical key phrases that match the one or more potential key phrases;
creating, by the processing system, one or more identified issues by refining the one or more potential issues according to a relationship with the user, wherein the relationship includes both prior communications with the user and account information of the user, wherein the refining comprises excluding first potential historical key phrases and including second potential historical key phrases based on services subscribed to by the user of a plurality of available services of the service provider, and adding potential issues to or excluding potential issues from the one or more identified issues based on the excluding the first potential historical key phrases and the including the second potential historical key phrases;

creating, by the processing system, a pool comprising the historical resolution resources associated with the historical issues most closely matching the one or more identified issues;

selecting, by the processing system, a potential resolution resource from the pool based on the relationship with the user;

suggesting, by the processing system, the potential resolution resource to the agent interacting with the user;

monitoring, by the processing system, the interaction between the user and the agent;

thereby updating the relationship with the user and discerning whether the agent resolved the issue;

requesting, by the processing system, an acceptance by the agent of the potential resolution resource;

in response to receiving the acceptance from the agent, facilitating, by the processing system, an exchange between the user and the potential resolution resource;

monitoring, by the processing system, the exchange between the user and the potential resolution resource; and updating, by the processing system, the analysis based on the interaction between the user and the agent and the exchange between the user and the potential resolution resource.

2. The method of claim 1, the analysis further including associating historical resolution resources with related ones of the historical key phrases.

3. The method of claim 1, wherein the historical interactions are limited to interactions with the user.

4. The method of claim 1, wherein the processing system is operated by the service provider and the historical interactions include interactions between representatives of the service provider and a plurality of customers of the service provider.

5. The method of claim 1, further including updating the relationship with the user based on the interaction between the user and the agent and the exchange between the user and the potential resolution resource.

6. The method of claim 1, further including discerning whether the potential resolution resource resolved the one or more identified issues based on the interaction between the user and the agent and the exchange between the user and the potential resolution resource.

7. The method of claim 1, wherein the relationship with the user includes an identification of one or more services subscribed to by the user, wherein the extracting the one or more potential key phrases and the identifying one or more matching key phrases are accomplished utilizing one or more libraries of terms related to the one or more services subscribed to by the user, and wherein the extracting the one or more potential key phrases and the identifying one or more matching key phrases are accomplished ignoring one or more libraries of terms related to one or more services to which the user does not subscribe.

8. The method of claim 1, wherein the agent is a live agent.

9. The method of claim 1, wherein the agent is an automated agent.

10. The method of claim 1, wherein the potential resolution resource is a live agent.

11. The method of claim 1, wherein the potential resolution resource is an automated agent.

12. A non-transitory machine-readable storage medium, comprising executable instructions that, when executed by a processor, facilitate performance of operations, comprising:

obtaining an analysis of a plurality of historical interactions with a plurality of users, the analysis including extracting a plurality of historical key phrases from the plurality of historical interactions, identifying a plurality of historical issues from the plurality of historical interactions, associating the historical key phrases with related ones of the historical issues, identifying a plurality of historical resolution resources involved in resolving the historical issues, and associating historical resolution resources with related ones of the historical issues;

monitoring an interaction between a device of a user and a live agent, thereby obtaining an indication of one or more user issues;

identifying one or more potential key phrases from the interaction between the user and the live agent;

determining one or more matching key phrases, by comparing the potential key phrases with the historical key phrases, wherein the one or more matching key phrases comprise one or more historical key phrases that match the one or more potential key phrases;

determining one or more potential issues as one or more historical issues associated with the one or more historical key phrases that match the one or more potential key phrases;

identifying a user issue by refining the one or more potential issues according to a relationship with the user, wherein the relationship includes both prior communications with the user and account information of the user, wherein the refining comprises excluding first potential historical key phrases and including second potential historical key phrases based on services subscribed to by the user of a plurality of available services, and adding potential issues to or excluding potential issues from the one or more identified issues based on the excluding the first potential historical key phrases and the including the second potential historical key phrases;

selecting a potential resolution resource from the historical resolution resources associated with the historical issues based on the user issue and the relationship with the user;

suggesting the potential resolution resource to the live agent;

requesting from the live agent an acceptance of the potential resolution resource;

in response to receiving the acceptance from the live agent, facilitating an exchange between the user and the potential resolution resource;

monitoring the exchange between the user and the potential resolution resource; and updating the analysis based on the interaction between the user and the live agent and the exchange between the user and the potential resolution resource.

13. The non-transitory machine-readable storage medium of claim 12, further including updating the relationship with the user based on the interaction between the user and the live agent and the exchange between the user and the potential resolution resource.

14. The non-transitory machine-readable storage medium of claim 12, further including discerning whether the potential resolution resource resolved the user issue based on the interaction between the user and the live agent and the exchange between the user and the potential resolution resource.

15. The non-transitory machine-readable storage medium of claim 12, wherein the potential resolution resource is a different live agent.

16. The non-transitory machine-readable storage medium of claim 12, wherein the potential resolution resource is an automated agent.

17. A system, comprising:
a processor;
a memory that stores executable instructions that, when executed by the processor, facilitate performance of operations, comprising:
creating an analysis of a plurality of historical interactions with a plurality of users of a plurality of different communication services provided by a service provider, the analysis including retrieving the plurality of historical interactions with the plurality of users, extracting a plurality of historical key phrases from the plurality of historical interactions, identifying a plurality of historical issues from the plurality of historical interactions, associating the historical key phrases with related ones of the historical issues, identifying a plurality of historical resolution resources involved in resolving the historical issues, associating historical resolution resources with related ones of the historical issues, and associating historical resolution resources with related ones of the historical key phrases;
monitoring an interaction between a device of a user and an agent, thereby discerning an indication of a user issue;
identifying one or more potential key phrases from the interaction between the device of the user and the agent;
identifying one or more matching key phrases, wherein the one or more matching key phrases comprise one or more historical key phrases that match the one or more potential key phrases;
identifying one or more potential issues as one or more historical issues associated with the one or more historical key phrases that match the one or more potential key phrases;
identifying the user issue by refining the one or more potential issues according to a relationship with the user, wherein the relationship includes account information of the user, wherein the refining comprises excluding first potential historical key phrases and including second potential historical key phrases based on services subscribed to by the user of a plurality of available services of the service provider, and adding potential issues to or excluding potential issues from the one or more identified issues based on the excluding the first potential historical key phrases and the including the second potential historical key phrases;
identifying a potential resolution resource from the historical resolution resources associated with the historical issues based on the user issue;
requesting an acceptance by the user of the potential resolution resource;
in response to receiving the acceptance from the user, facilitating an exchange between the user and the potential resolution resource;
monitoring the exchange between the user and the potential resolution resource; and
updating the analysis based on the exchange between the user and the potential resolution resource.

18. The system of claim 17, wherein the agent is a first live agent.

19. The system of claim 18, wherein the potential resolution resource is a second live agent.

20. The system of claim 18, wherein the potential resolution resource is an automated agent.

* * * * *